April 7, 1925.

D. GERBER

ICE CREAM CONE

Filed Sept. 7, 1923

1,532,806

Inventor
David Gerber
By Church & Church
His Attorneys

Patented Apr. 7, 1925.

1,532,806

UNITED STATES PATENT OFFICE.

DAVID GERBER, OF BALTIMORE, MARYLAND, ASSIGNOR TO MARYLAND BAKING COMPANY, A CO-PARTNERSHIP COMPOSED OF JOSEPH SHAPIRO, ISAAC SHAPIRO, NATHAN SHAPIRO, AND SAMUEL SHAPIRO, OF BALTIMORE, MARYLAND.

ICE-CREAM CONE.

Application filed September 7, 1923. Serial No. 661,420.

*To all whom it may concern:*

Be it known that I, DAVID GERBER, a citizen of the United States, residing at Baltimore, in the State of Maryland, have invented certain new and useful Improvements in Ice-Cream Cones; and I do hereby declare the following to be a full, clear, and exact description of the same, reference being had to the accompanying drawings forming part of this specification.

This invention relates to ice cream cones made of edible material and adapted to be conveniently held in the hand while the ice cream in the cone is being eaten. The object of the present invention is to provide a cone of this type which will not wedge or split when packed for shipment in boxes of nested sticks of cones.

Ice cream cones are usually made of entire conical shape, but the more recent improvements in this art tend to the torch or bouquet shape, illustrated in the drawing, the invention, however, being not limited in any way to the general shape of the cone shown. When cones of either type are nested together in sticks of a dozen or so, the wedging action of the cones, due to jar given to the package, ofttimes splits the cones, rendering them unfit for sale, and the losses in this way sometimes reach large figures. In addition to the splitting of the cones by this wedging action, other objections are also encountered, one of the principal being that the wedged cones stick so tight that they adhere together so that it is practically impossible to separate them.

In the drawings,—

Figure 1:
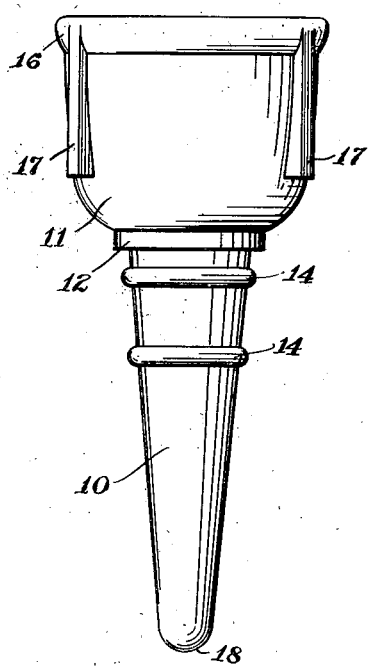
Figure 1 is an elevation of a cone embodying the present invention.
Figure 2:
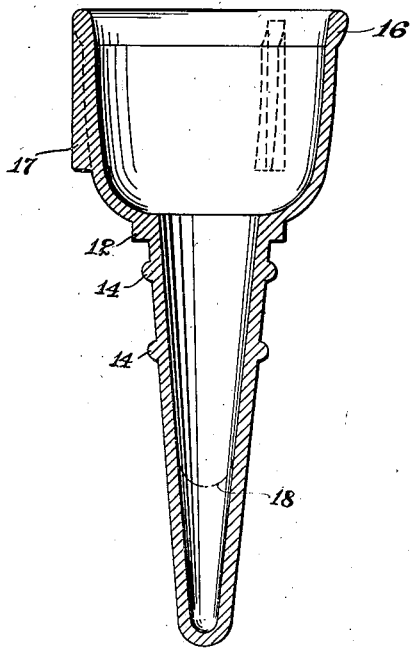
Fig. 2 is a central vertical section.

The cone is of the usual pastry material and, in its preferred form shown, consists of a slender conical handle such as 10 integral with a bowl-like portion 11 having a rectangular strengthening ring 12 between the two portions to add to the beauty of the article as well as to increase the strength at what would otherwise be the weakest portion of the cone. The round rings or annular ribs 14 on the handle are partly for ornament and partly to render more convenient the holding of the cone in the hand.

The top or margin of the bowl 11 is finished with an annular bead 16 of the usual type and size, and integral with this bead and extending downward a part of the distance from the bead to the ring 12 is a plurality of vertically disposed ribs 17, the outer surfaces of which are preferably either plane or curved to the surface of a cylinder whose diameter is that of the outside diameter of the bead. The function of these ribs which, while preferably three in number, may be two, four or more, as desired, is to support a nested cone on the bead of the cone below it, and for this purpose, the length or vertical height of the rib is such that the diameter of the rounded point 18 will be held slightly out of contact with the inner wall 19 of the handle 10 of the adjacent cone. In other words, the length or height of the rib 17 is made slightly greater than the distance from tip to tip of nested cones exactly similar to those shown, but in which the ribs 17 are omitted. By making the ribs of this size, the only points of contact between nested cones will be between the bottoms of the ribs and the bead of the next cone of the nest or stick.

What I claim is:

1. An ice cream cone having on the outer surface of the cone near the top a plurality of vertical ribs to prevent too snug nesting of telescoped cones.

2. An ice cream cone having on the outer surface of the cone near the top a plurality of equispaced vertical ribs so as to support a nested cone upon the rim of the cone above it.

3. An ice cream cone having a slender hollow handle and a bowl-shaped body, a marginal bead on said bowl, and a plurality of vertically disposed ribs extending from the bead partly down the bowl.

4. An ice cream cone having a slender hollow handle and a bowl-shaped body, a marginal bead on said bowl, annular strengthening ribs on said handle, and a plurality of vertically disposed ribs extending from the bead partly down the bowl.

5. A torch-shaped ice cream cone consisting of a joined bowl and slender hollow conical handle, an annular ring at the junction of said bowl and handle, a bead at the rim of said bowl and three equispaced vertical ribs extending downward from said bead and forming the sole support of each cone of a nested series, upon the cone below it, the three ribs of each upper cone resting upon the bead of the next lower cone to minimize contact of the walls of adjacent handles 6. A torch-shaped ice cream cone consisting of a joined bowl and slender hollow conical handle, an annular ring at the junction of said bowl and handle, a bead at the rim of said bowl and three equispaced vertical ribs extending downward from said bead and forming the sole support of each cone of a nested series, upon the cone below it, the three ribs of each upper cone resting upon the bead of the next lower cone to minimize contact of the walls of adjacent handles, the length of said ribs being slightly greater than the space between nested cones of similar shape but without spacing ribs.

DAVID GERBER.